United States Patent
Kim et al.

(10) Patent No.: US 10,292,116 B2
(45) Date of Patent: May 14, 2019

(54) METHOD OF PERFORMING RTS/CTS PROCEDURE IN WIRELESS LAN SYSTEM AND APPARATUS THEREOF

(71) Applicant: LG ELECTRONICS INC., Seoul (KR)

(72) Inventors: Jeongki Kim, Seoul (KR); Kiseon Ryu, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 114 days.

(21) Appl. No.: 15/372,251

(22) Filed: Dec. 7, 2016

(65) Prior Publication Data

US 2017/0164371 A1 Jun. 8, 2017

Related U.S. Application Data

(60) Provisional application No. 62/264,333, filed on Dec. 8, 2015, provisional application No. 62/264,347, filed on Dec. 8, 2015.

(51) Int. Cl.
| | |
|---|---|
| *H04L 5/00* | (2006.01) |
| *H04W 52/32* | (2009.01) |
| *H04W 74/08* | (2009.01) |
| *H04W 84/12* | (2009.01) |

(52) U.S. Cl.
CPC ........ *H04W 52/325* (2013.01); *H04L 5/0048* (2013.01); *H04W 74/0816* (2013.01); *H04W 84/12* (2013.01)

(58) Field of Classification Search
CPC .......... H04W 74/0816; H04W 52/325; H04W 52/30; H04L 5/0048
See application file for complete search history.

(56) References Cited

U.S. PATENT DOCUMENTS

| | | | | |
|---|---|---|---|---|
| 2007/0037600 A1* | 2/2007 | Fukuda | ............... | H04W 52/245 455/522 |
| 2012/0264447 A1* | 10/2012 | Rieger, III | ............ | G01S 5/0252 455/456.1 |
| 2015/0063189 A1* | 3/2015 | Merlin | ................ | H04W 72/005 370/312 |
| 2017/0171884 A1* | 6/2017 | Niu | ..................... | H04W 74/006 |

OTHER PUBLICATIONS

Prasad et al, "Sector-based RTS/CTS Access Scheme for High Density WLAN Sensor Networks", 2014, IEEE.*

* cited by examiner

*Primary Examiner* — Omer S Mian
(74) *Attorney, Agent, or Firm* — Lee, Hong, Degerman, Kang & Waimey

(57) ABSTRACT

Disclosed herein is a method of initiating a RTS/CTS procedure at a STA in a wireless LAN system. According to an embodiment of this invention, the method includes receiving, from an AP, one or more RTS transmission control parameters, determining whether to transmit an RTS frame prior to transmitting a first frame, based on the one or more RTS transmission control parameters; and transmitting at least one of the RTS frame or the first frame, wherein the one or more RTS transmission control parameters includes a transmission power threshold for controlling the RTS frame transmission, and wherein the STA transmits the RTS frame prior to transmitting the first frame when a transmission power of the first frame is less than or equals to the transmission power threshold received from the AP.

12 Claims, 16 Drawing Sheets

FIG. 12

| L-STF | L-LTF | L-SIG | VHT-SIG A | VHT-STF | VHT-LTF | VHT-SIG B | Data |
|---|---|---|---|---|---|---|---|
| 8us | 8us | 4us | 8us | 4us | 4us per VHT-LTF symbol | 4us | |

FIG. 18

| Element ID | Length | RTS required Field | TX_PW_Threshold |

METHOD OF PERFORMING RTS/CTS PROCEDURE IN WIRELESS LAN SYSTEM AND APPARATUS THEREOF

Pursuant to 35 U.S.C. § 119(e), this application claims the benefit of U.S. Provisional Patent Application Nos. 62/264,333, filed on Dec. 8, 2015 and 62/264,347, filed on Dec. 8, 2015, the contents of which are all hereby incorporated by reference herein in their entirety.

BACKGROUND OF THE INVENTION

Field of the Invention

The present invention relates to relates to a wireless LAN system, more particularly, to a method of transmitting or receiving an request-to-send (RTS) frame/a clear-to-send (CTS) frame before transmitting a frame in a wireless LAN system and an apparatus for the same.

Discussion of the Related Art

Standards for Wireless Local Area Network (WLAN) technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

SUMMARY OF THE INVENTION

The present invention is directed to a method of performing and controlling an RTS/CTS procedure in a dense environment and an apparatus for the same An object of the present invention is to provide a method of more efficiently performing an RTS/CTS procedure in a dense environment in which hidden node problem occurs frequently, by adaptively controlling the RTS/CTS procedure initiation using a RTS transmission control parameter including a transmission power threshold and an apparatus for the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

In an aspect of the present invention, a method of initiating a request-to-send (RTS)/clear-to-send (CTS) procedure at a station (STA) in a wireless LAN system includes receiving, from an access point (AP), one or more RTS transmission control parameters, determining whether to transmit an RTS frame prior to transmitting a first frame, based on the one or more RTS transmission control parameters, and transmitting at least one of the RTS frame or the first frame, wherein the one or more RTS transmission control parameters includes a transmission power threshold for controlling the RTS frame transmission, and wherein the STA transmits the RTS frame prior to transmitting the first frame when a transmission power of the first frame is less than or equals to the transmission power threshold received from the AP.

In another aspect of the present invention, a station (STA) initiating a request-to-send (RTS)/clear-to-send (CTS) procedure includes a receiver to receive, from an access point (AP), one or more RTS transmission control parameters, a processor to determine whether to transmit an RTS frame prior to transmitting a first frame, based on the one or more RTS transmission control parameters and a transmitter to transmit at least one of the RTS frame or the first frame, wherein the one or more RTS transmission control parameters includes a transmission power threshold for controlling the RTS frame transmission, and wherein the processor control the transmitter to transmit the RTS frame prior to transmitting the first frame when a transmission power of the first frame is less than or equals to the transmission power threshold received from the AP.

In another aspect of the present invention, a method of controlling a request-to-send (RTS)/clear-to-send (CTS) procedure of a station (STA) by an access point (AP) in a wireless LAN system includes transmitting, to a STA, one or more RTS transmission control parameters, and receiving, from the STA, at least one of the RTS frame or a first frame, wherein the one or more RTS transmission control parameters includes a transmission power threshold for controlling the RTS frame transmission, and wherein the AP receives the RTS frame prior to receiving the first frame when a transmission power of the first frame is less than or equals to the transmission power threshold transmitted by the AP.

Preferably, the one or more RTS transmission control parameters may be received through at least one of a beacon frame, a probe response frame and an association response frame from the AP, and the received one or more RTS transmission control parameters may be commonly applied to STAs associated with the AP.

Preferably, the one or more RTS transmission control parameters may be received through a MAC header of a downlink frame from the AP, and the one or more RTS transmission control parameters may be specific to the STA.

Preferably, the one or more RTS transmission control parameters may include at least one of a RTS threshold indicating a predetermined packet length and a RTS transmission required field.

Preferably, the STA may transmit the RTS frame prior to transmitting the first frame when a packet length of the first frame is longer than the RTS threshold received from the AP and the transmission power of the first frame is less than or equals to the transmission power threshold received from the AP.

Preferably, the STA may transmit the RTS frame prior to transmitting the first frame when the RTS transmission required field received from the AP has been enabled and the transmission power of the first frame is less than or equals to the transmission power threshold received from the AP.

Preferably, when the RTS transmission required field received from the AP has been disabled, the STA may determine whether to transmit an RTS frame by using only a dot11RTSThreshold parameter that is locally stored in the STA.

Preferably, when the RTS transmission required field received from the AP has been enabled, the RTS threshold received from the AP may override the dot11RTSThreshold parameter locally stored in the STA.

Preferably, the STA may transmit the first frame without transmitting the RTS frame when the transmission power of the first frame is greater than the transmission power threshold received from the AP.

It is to be understood that both the foregoing general description and the following detailed description of the present invention are exemplary and explanatory and are intended to provide further explanation of the invention as claimed.

BRIEF DESCRIPTION OF THE DRAWINGS

FIG. 12 illustrates an example of the VHT PPDU.

FIG. 18 illustrates an example of the RTS transmission control parameters according to an embodiment of this invention.

DETAILED DESCRIPTION OF THE INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

As described before, the following description is given of a method and apparatus for increasing a spatial reuse rate in a Wireless Local Area Network (WLAN) system. To do so, a WLAN system to which the present invention is applied will first be described in detail.

Figure 1:
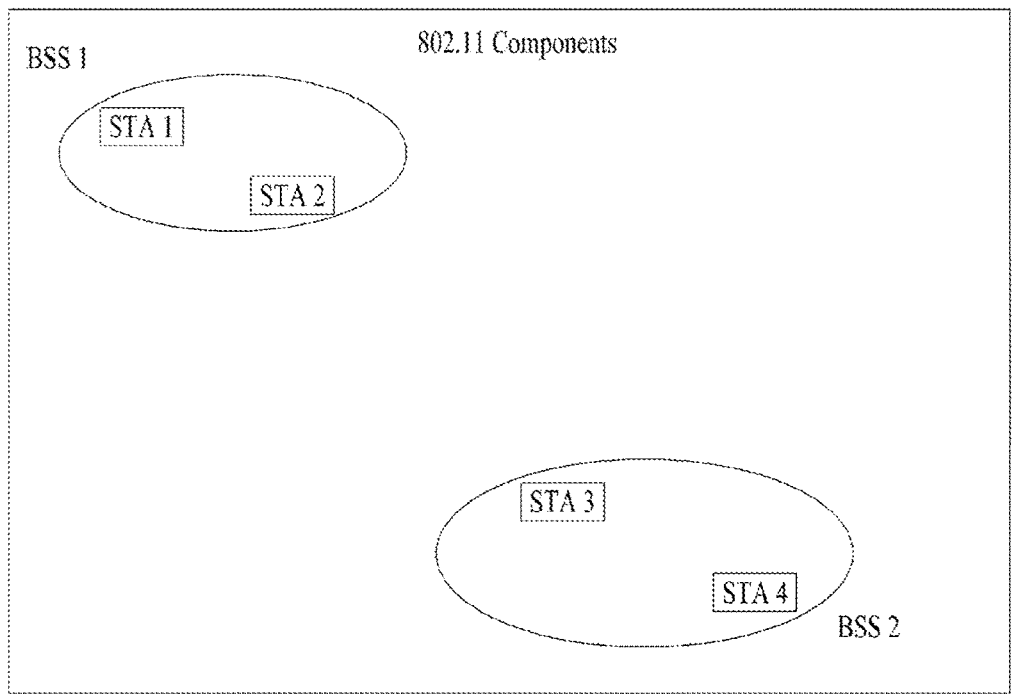
FIG. 1 illustrates an example of a configuration of a wireless LAN system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Media Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
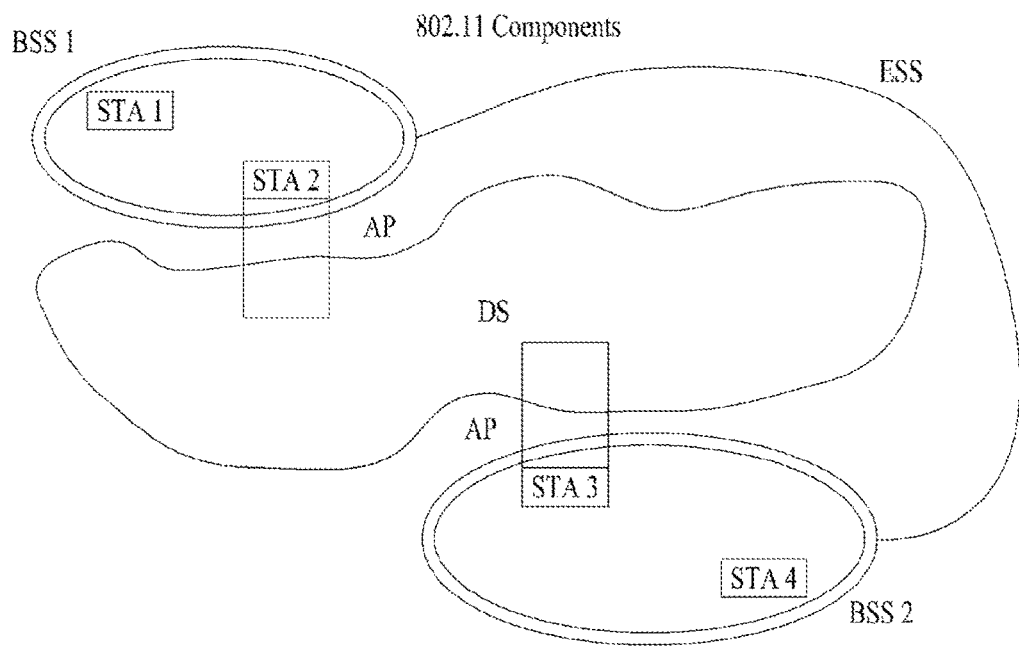
FIG. 2 illustrates another example of a configuration of a wireless LAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Layer Architecture

An operation of a STA in a WLAN system may be described from the perspective of a layer architecture. A processor may implement the layer architecture in terms of device configuration. The STA may have a plurality of layers. For example, the 802.11 standards mainly deal with a MAC sublayer and a PHY layer on a Data Link Layer (DLL). The PHY layer may include a Physical Layer Convergence Protocol (PLCP) entity, a Physical Medium Dependent (PMD) entity, and the like. Each of the MAC sublayer and the PHY layer conceptually includes management entities called MAC sublayer Management Entity (MLME) and Physical Layer Management Entity (PLME). These entities provide layer management service interfaces through which a layer management function is executed.

To provide a correct MAC operation, a Station Management Entity (SME) resides in each STA. The SME is a layer independent entity which may be perceived as being present in a separate management plane or as being off to the side.

While specific functions of the SME are not described in detail herein, the SME may be responsible for collecting layer-dependent states from various Layer Management Entities (LMEs) and setting layer-specific parameters to similar values. The SME may execute these functions and implement a standard management protocol on behalf of general system management entitles.

The above-described entities interact with one another in various manners. For example, the entities may interact with one another by exchanging GET/SET primitives between them. A primitive refers to a se of elements or parameters related to a specific purpose. An XX-GET.request primitive is used to request a predetermined MIB attribute value (management information-based attribute information). An XX-GET.confirm primitive is used to return an appropriate MIB attribute information value when the Status field indicates "Success" and to return an error indication in the Status field when the Status field does not indicate "Success". An XX-SET.request primitive is used to request setting of an indicated MIB attribute to a predetermined value. When the MIB attribute indicates a specific operation, the MIB attribute requests the specific operation to be performed. An XX-SET.confirm primitive is used to confirm that the indicated MIB attribute has been set to a requested value when the Status field indicates "Success" and to return an error condition in the Status field when the Status field does not indicate "Success". When the MIB attribute indicates a specific operation, it confirms that the operation has been performed, Also, the MIME and the SME may exchange various MLME_GET/SET primitives through an MLME Service Access Point (MLME_SAP). In addition, various PLME_GET/SET primitives may be exchanged between the PLME and the SME through a PLME_SAP, and exchanged between the MLME and the PLME through an MLME-PLME_SAP.

Link Setup Process

Figure 3:
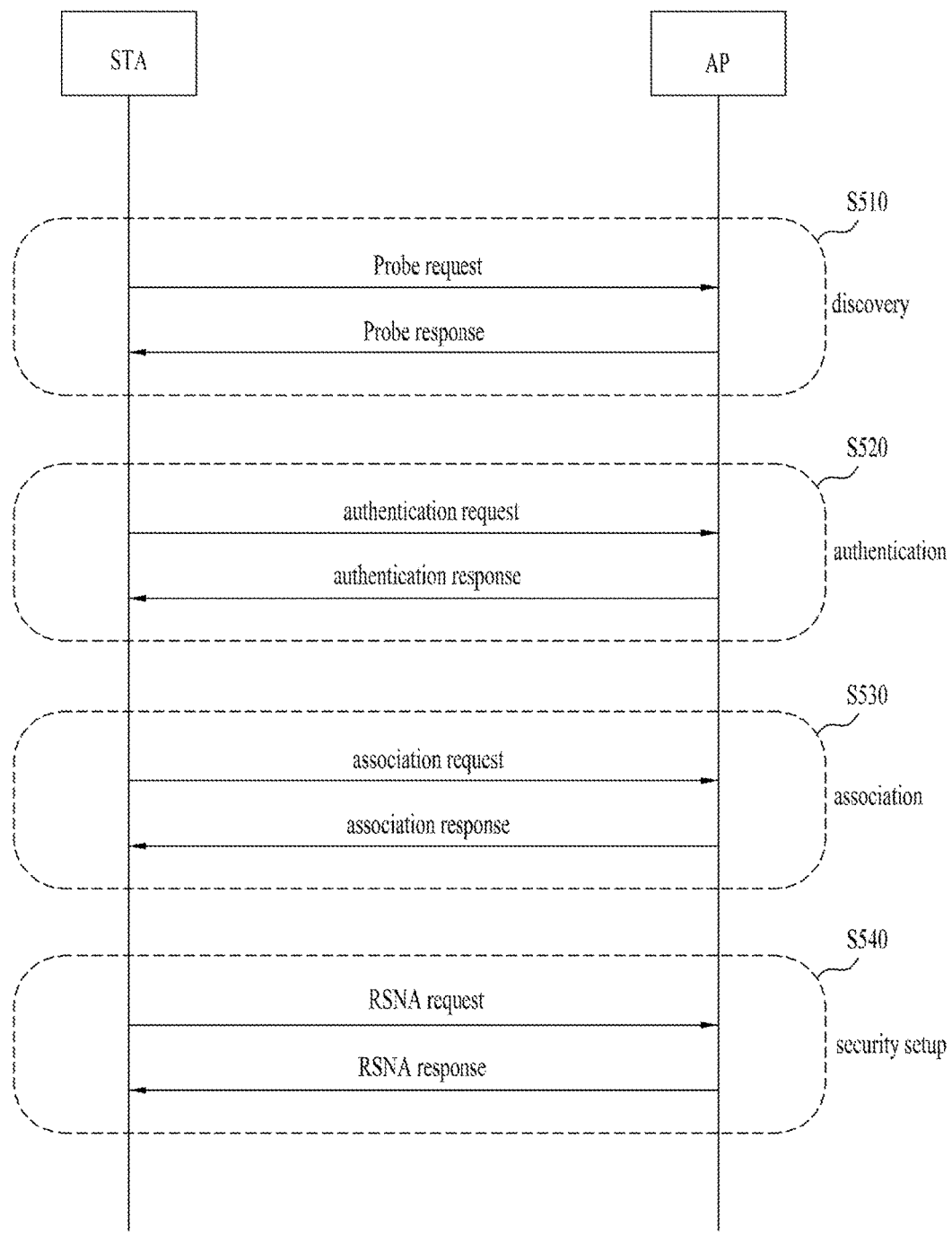
FIG. 3 illustrates a general link setup procedure.

FIG. 3 is a flowchart explaining a general link setup process according to an exemplary embodiment of the present invention.

In order to allow a STA to establish link setup on the network as well as to transmit/receive data over the network, the STA must perform such link setup through processes of network discovery, authentication, and association, and must establish association and perform security authentication. The link setup process may also be referred to as a session initiation process or a session setup process. In addition, an association step is a generic term for discovery, authentication, association, and security setup steps of the link setup process.

Link setup process is described referring to FIG. 3.

In step S510, STA may perform the network discovery action. The network discovery action may include the STA scanning action. That is, STA must search for an available network so as to access the network. The STA must identify a compatible network before participating in a wireless network. Here, the process for identifying the network contained in a specific region is referred to as a scanning process.

The scanning scheme is classified into active scanning and passive scanning.

FIG. 3 is a flowchart illustrating a network discovery action including an active scanning process. In the case of the active scanning, a STA configured to perform scanning transmits a probe request frame and waits for a response to the probe request frame, such that the STA can move between channels and at the same time can determine which Access Point (AP) is present in a peripheral region. A responder transmits a probe response frame, acting as a response to the probe request frame, to the STA having transmitted the probe request frame. In this case, the responder may be a STA that has finally transmitted a beacon frame in a BSS of the scanned channel. In BSS, since the AP transmits the beacon frame, the AP operates as a responder. In IBSS, since STAs of the IBSS sequentially transmit the beacon frame, the responder is not constant. For example, the STA, that has transmitted the probe request frame at Channel #1 and has received the probe response frame at Channel #1, stores BSS-associated information contained in the received probe response frame, and moves to the next channel (for example, Channel #2), such that the STA may perform scanning using the same method (i.e., probe request/response transmission/reception at Channel #2).

Although not shown in FIG. 3, the scanning action may also be carried out using passive scanning. A STA configured to perform scanning in the passive scanning mode waits for a beacon frame while simultaneously moving from one channel to another channel. The beacon frame is one of management frames in IEEE 802.11, indicates the presence of a wireless network, enables the STA performing scanning to search for the wireless network, and is periodically transmitted in a manner that the STA can participate in the wireless network. In BSS, the AP is configured to periodically transmit the beacon frame. In IBSS, STAs of the IBSS are configured to sequentially transmit the beacon frame. If each STA for scanning receives the beacon frame, the STA stores BSS information contained in the beacon frame, and moves to another channel and records beacon frame information at each channel. The STA having received the beacon frame stores BSS-associated information contained in the received beacon frame, moves to the next channel, and thus performs scanning using the same method.

In comparison between the active scanning and the passive scanning, the active scanning is more advantageous than the passive scanning in terms of delay and power consumption.

After the STA discovers the network, the STA may perform the authentication process in step S520. The authentication process may be referred to as a first authentication process in such a manner that the authentication process can be clearly distinguished from the security setup process of step S540.

The authentication process may include transmitting an authentication request frame to an AP by the STA, and transmitting an authentication response frame to the STA by the AP in response to the authentication request frame. The authentication frame used for authentication request/response may correspond to a management frame.

The authentication frame may include an authentication algorithm number, an authentication transaction sequence number, a state code, a challenge text, a Robust Security Network (RSN), a Finite Cyclic Group (FCG), etc. The above-mentioned information contained in the authentication frame may correspond to some parts of information capable of being contained in the authentication request/response frame, may be replaced with other information, or may include additional information.

The STA may transmit the authentication request frame to the AP. The AP may decide whether to authenticate the corresponding STA on the basis of information contained in the received authentication request frame. The AP may provide the authentication result to the STA through the authentication response frame.

After the STA has been successfully authenticated, the association process may be carried out in step S530. The association process may involve transmitting an association request frame to the AP by the STA, and transmitting an association response frame to the STA by the AP in response to the association request frame.

For example, the association request frame may include information associated with various capabilities, a beacon listen interval, a Service Set Identifier (SSID), supported rates, supported channels, RSN, mobility domain, supported operating classes, a TIM (Traffic Indication Map) broadcast request, interworking service capability, etc.

For example, the association response frame may include information associated with various capabilities, a state code, an Association ID (AID), supported rates, an Enhanced Distributed Channel Access (EDCA) parameter set, a Received Channel Power Indicator (RCPI), a Received Signal to Noise Indicator (RSNI), mobility domain, a timeout interval (association comeback time), an overlapping BSS scan parameter, a TIM broadcast response, a Quality of Service (QoS) map, etc.

The above-mentioned information may correspond to some parts of information capable of being contained in the association request/response frame, may be replaced with other information, or may include additional information.

After the STA has been successfully associated with the network, a security setup process may be carried out in step S540. The security setup process of Step S540 may be referred to as an authentication process based on Robust Security Network Association (RSNA) request/response. The authentication process of step S520 may be referred to as a first authentication process, and the security setup process of Step S540 may also be simply referred to as an authentication process.

For example, the security setup process of Step S540 may include a private key setup process through 4-way handshaking based on an Extensible Authentication Protocol over LAN (EAPOL) frame. In addition, the security setup process may also be carried out according to other security schemes not defined in IEEE 802.11 standards.

Medium Access Mechanism

In the IEEE 802.11-based WLAN system, a basic access mechanism of Medium Access Control (MAC) is a Carrier Sense Multiple Access with Collision Avoidance (CSMA/CA) mechanism. The CSMA/CA mechanism is referred to as a Distributed Coordination Function (DCF) of IEEE 802.11 MAC, and basically includes a "Listen Before Talk" access mechanism. In accordance with the above-mentioned access mechanism, the AP and/or STA may perform Clear Channel Assessment (CCA) for sensing an RF channel or medium during a predetermined time interval [for example, DCF Inter-Frame Space (DIFS)], prior to data transmission. If it is determined that the medium is in the idle state, frame transmission through the corresponding medium begins. On the other hand, if it is determined that the medium is in the occupied state, the corresponding AP and/or STA does not start its own transmission, establishes a delay time (for example, a random backoff period) for medium access, and attempts to start frame transmission after waiting for a predetermined time. Through application of a random backoff period, it is expected that multiple STAs will attempt to start frame transmission after waiting for different times, resulting in minimum collision.

In addition, IEEE 802.11 MAC protocol provides a Hybrid Coordination Function (HCF). HCF is based on DCF and Point Coordination Function (PCF). PCF refers to the polling-based synchronous access scheme in which periodic polling is executed in a manner that all reception (Rx) APs and/or STAs can receive the data frame. In addition, HCF includes Enhanced Distributed Channel Access (EDCA) and HCF Controlled Channel Access (HCCA). EDCA is achieved when the access scheme provided from a provider to a plurality of users is contention-based. HCCA is achieved by the contention-free-based channel access scheme based on the polling mechanism. In addition, HCF includes a medium access mechanism for improving Quality of Service (QoS) of WLAN, and may transmit QoS data in both a Contention Period (CP) and a Contention Free Period (CFP).

Figure 4:
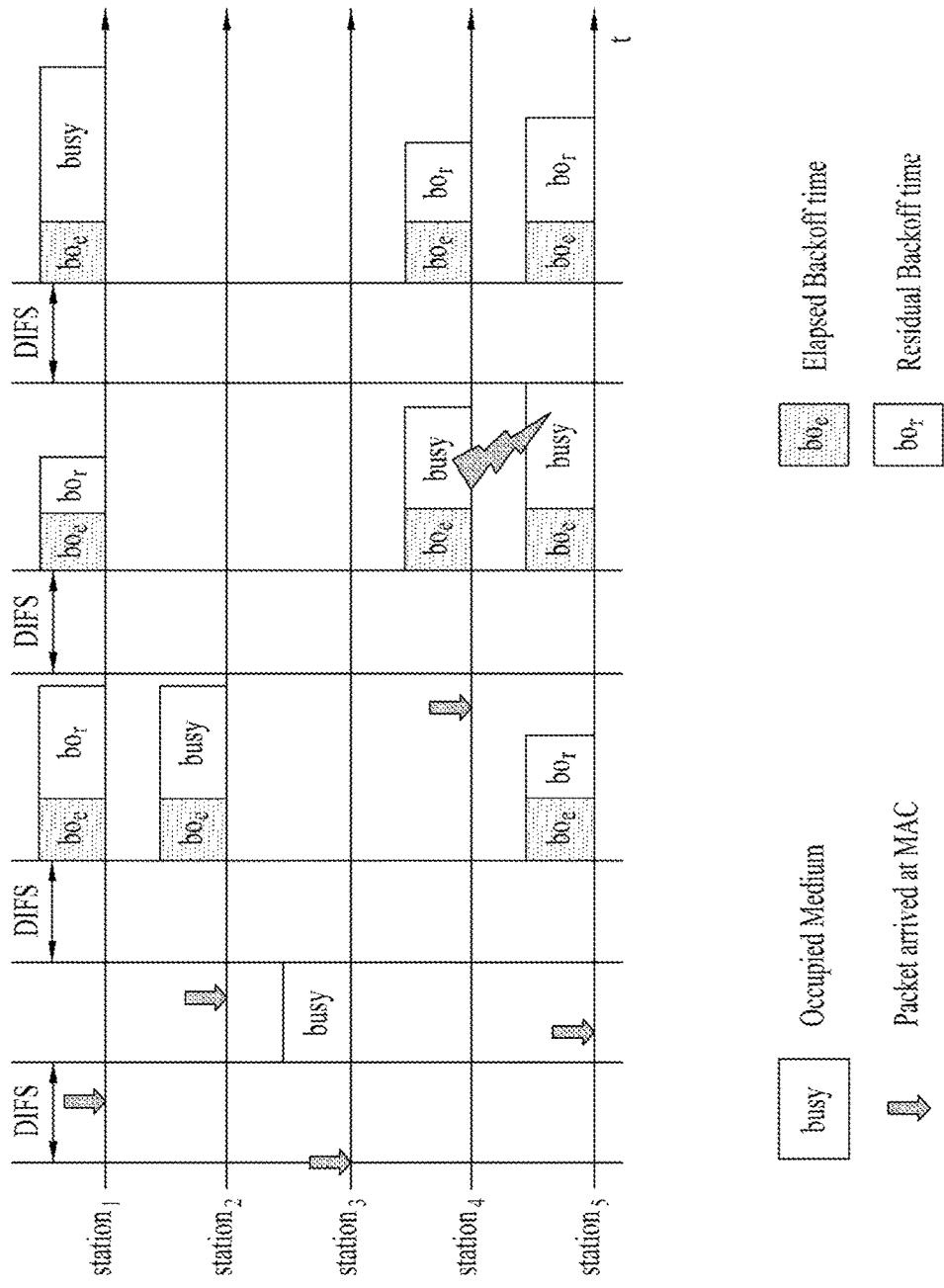
FIG. 4 illustrates a backoff procedure.

FIG. 4 is a conceptual diagram illustrating a backoff process.

Operations based on a random backoff period will hereinafter be described with reference to FIG. 4. If the occupy- or busy-state medium is shifted to an idle state, several STAs may attempt to transmit data (or frame). As a method for implementing a minimum number of collisions, each STA selects a random backoff count, waits for a slot time corresponding to the selected backoff count, and then attempts to start data transmission. The random backoff count has a value of a Packet Number (PN), and may be set to one of 0 to CW values. In this case, CW refers to a Contention Window parameter value. Although an initial value of the CW parameter is denoted by CWmin, the initial value may be doubled in case of a transmission failure (for example, in the case in which ACK of the transmission frame is not received). If the CW parameter value is denoted by CWmax, CWmax is maintained until data transmission is successful, and at the same time it is possible to attempt to start data transmission. If data transmission was successful, the CW parameter value is reset to CWmin. Preferably, CW, CWmin, and CWmax are set to $2^n-1$ (where n=0, 1, 2, . . . ).

If the random backoff process starts operation, the STA continuously monitors the medium while counting down the backoff slot in response to the decided backoff count value. If the medium is monitored as the occupied state, the countdown stops and waits for a predetermined time. If the medium is in the idle state, the remaining countdown restarts.

As shown in the example of FIG. 4, if a packet to be transmitted to MAC of STA3 arrives at the STA3, the STA3 determines whether the medium is in the idle state during the DIFS, and may directly start frame transmission. In the meantime, the remaining STAs monitor whether the medium is in the busy state, and wait for a predetermined time. During the predetermined time, data to be transmitted may occur in each of STA1, STA2, and STA5. If the medium is in the idle state, each STA waits for the DIFS time and then performs countdown of the backoff slot in response to a random backoff count value selected by each STA. The example of FIG. 4 shows that STA2 selects the lowest backoff count value and STA1 selects the highest backoff count value. That is, after STA2 finishes backoff counting, the residual backoff time of STA5 at a frame transmission start time is shorter than the residual backoff time of STA1. Each of STA1 and STA5 temporarily stops countdown while STA2 occupies the medium, and waits for a predetermined time. If occupying of the STA2 is finished and the medium re-enters the idle state, each of STA1 and STA5 waits for a predetermined time DIFS, and restarts backoff counting. That is, after the remaining backoff slot as long as the residual backoff time is counted down, frame transmission may start operation. Since the residual backoff time of STA5 is shorter than that of STA1, STA5 starts frame transmission. Meanwhile, data to be transmitted may occur in STA4 while STA2 occupies the medium. In this case, if the medium is in the idle state, STA4 waits for the DIFS time, performs countdown in response to the random backoff count value selected by the STA4, and then starts frame transmission. FIG. 4 exemplarily shows the case in which the residual backoff time of STA5 is identical to the random backoff count value of STA4 by chance. In this case, an unexpected collision may occur between STA4 and STA5. If the collision occurs between STA4 and STA5, each of STA4 and STA5 does not receive ACK, resulting in the occurrence of a failure in data transmission. In this case, each of STA4 and STA5 increases the CW value two times, and STA4 or STA5 may select a random backoff count value and then perform countdown. Meanwhile, STA1 waits for a predetermined time while the medium is in the occupied state due to transmission of STA4 and STA5. In this case, if the medium is in the idle state, STA1 waits for the DIFS time, and then starts frame transmission after lapse of the residual backoff time.

STA Sensing Operation

As described above, the CSMA/CA mechanism includes not only a physical carrier sensing mechanism in which the AP and/or STA can directly sense the medium, but also a virtual carrier sensing mechanism. The virtual carrier sensing mechanism can solve some problems (such as a hidden node problem) encountered in the medium access. For the virtual carrier sensing, MAC of the WLAN system can utilize a Network Allocation Vector (NAV). In more detail, by means of the NAV value, the AP and/or STA, each of which currently uses the medium or has authority to use the medium, may inform another AP and/or another STA for the remaining time in which the medium is available. Accordingly, the NAV value may correspond to a reserved time in which the medium will be used by the AP and/or STA configured to transmit the corresponding frame. A STA having received the NAV value may prohibit medium access (or channel access) during the corresponding reserved time. For example, NAV may be set according to the value of a 'duration' field of the MAC header of the frame.

The robust collision detect mechanism has been proposed to reduce the probability of such collision, and as such a detailed description thereof will hereinafter be described with reference to FIGS. 7 and 8. Although an actual carrier sensing range is different from a transmission range, it is assumed that the actual carrier sensing range is identical to the transmission range for convenience of description and better understanding of the present invention.

Figure 5:
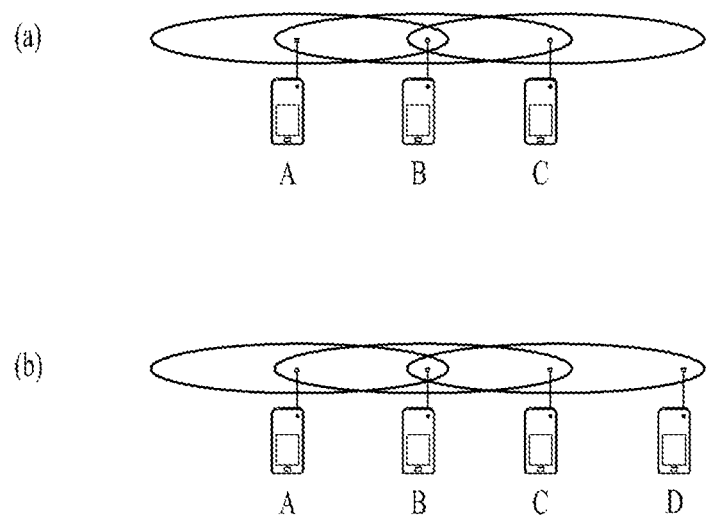
FIG. 5 is an explanatory diagram of a hidden node and an exposed node.

FIG. 5 is a conceptual diagram illustrating a hidden node and an exposed node.

FIG. 5(a) exemplarily shows the hidden node. In FIG. 5(a), STA A communicates with STA B, and STA C has information to be transmitted. In FIG. 5(a), STA C may determine that the medium is in the idle state when performing carrier sensing before transmitting data to STA B, under the condition that STA A transmits information to STA B. Since transmission of STA A (i.e., occupied medium) may not be detected at the location of STA C, it is determined that the medium is in the idle state. In this case, STA B simultaneously receives information of STA A and information of STA C, resulting in the occurrence of collision. Here, STA A may be considered as a hidden node of STA C.

FIG. 5(b) exemplarily shows an exposed node. In FIG. 5(b), under the condition that STA B transmits data to STA A, STA C has information to be transmitted to STA D. If STA C performs carrier sensing, it is determined that the medium is occupied due to transmission of STA B. Therefore, although STA C has information to be transmitted to STA D, the medium-occupied state is sensed, such that the STA C must wait for a predetermined time (i.e., standby mode) until the medium is in the idle state. However, since STA A is actually located out of the transmission range of STA C, transmission from STA C may not collide with transmission from STA B from the viewpoint of STA A, such that STA C unnecessarily enters the standby mode until STA B stops transmission. Here, STA C is referred to as an exposed node of STA B.

Figure 6:
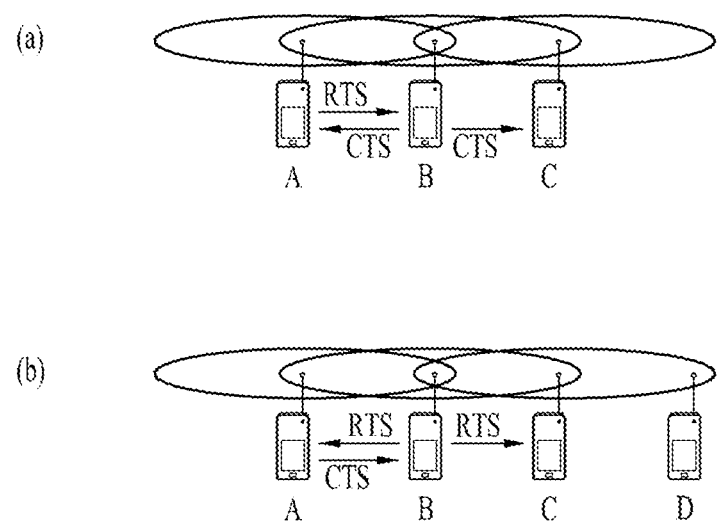
FIG. 6 is an explanatory diagram of RTS and CTS.

FIG. 6 is a conceptual diagram illustrating Request To Send (RTS) and Clear To Send (CTS).

In order to efficiently utilize the collision avoidance mechanism under the above-mentioned situation of FIG. 5, it is possible to use a short signaling packet such as RTS and CTS. RTS/CTS between two STAs may be overheard by peripheral STA(s), such that the peripheral STA(s) may consider whether information is communicated between the two STAs. For example, if STA to be used for data transmission transmits the RTS frame to the STA having received data, the STA having received data transmits the CTS frame to peripheral STAs, and may inform the peripheral STAs that the STA is going to receive data.

FIG. 6(a) exemplarily shows the method for solving problems of the hidden node. In FIG. 6(a), it is assumed that each of STA A and STA C is ready to transmit data to STA B. If STA A transmits RTS to STA B, STA B transmits CTS to each of STA A and STA C located in the vicinity of the STA B. As a result, STA C must wait for a predetermined time until STA A and STA B stop data transmission, such that collision is prevented from occurring.

FIG. 6(b) exemplarily shows the method for solving problems of the exposed node. STA C performs overhearing of RTS/CTS transmission between STA A and STA B, such that STA C may determine no collision although it transmits data to another STA (for example, STA D). That is, STA B transmits an RTS to all peripheral STAs, and only STA A having data to be actually transmitted can transmit a CTS. STA C receives only the RTS and does not receive the CTS of STA A, such that it can be recognized that STA A is located outside of the carrier sensing range of STA C.

Power Management

As described above, the WLAN system has to perform channel sensing before STA performs data transmission/reception. The operation of always sensing the channel causes persistent power consumption of the STA. There is not much difference in power consumption between the Reception (Rx) state and the Transmission (Tx) state. Continuous maintenance of the Rx state may cause large load to a power-limited STA (i.e., STA operated by a battery). Therefore, if STA maintains the Rx standby mode so as to persistently sense the channel, power is inefficiently consumed without special advantages in terms of WLAN throughput. In order to solve the above-mentioned problem, the WLAN system supports a Power Management (PM) mode of the STA.

The PM mode of the STA is classified into an active mode and a Power Save (PS) mode. The STA is basically operated in the active mode. The STA operating in the active mode maintains an awake state. If the STA is in the awake state, the STA may normally operate such that it can perform frame transmission/reception, channel scanning, or the like. On the other hand, STA operating in the PS mode is configured to switch from the doze state to the awake state or vice versa. STA operating in the sleep state is operated with minimum power, and the STA does not perform frame transmission/reception and channel scanning.

The amount of power consumption is reduced in proportion to a specific time in which the STA stays in the sleep state, such that the STA operation time is increased in response to the reduced power consumption. However, it is impossible to transmit or receive the frame in the sleep state, such that the STA cannot mandatorily operate for a long period of time. If there is a frame to be transmitted to the AP, the STA operating in the sleep state is switched to the awake state, such that it can transmit/receive the frame in the awake state. On the other hand, if the AP has a frame to be transmitted to the STA, the sleep-state STA is unable to receive the frame and cannot recognize the presence of a frame to be received. Accordingly, STA may need to switch to the awake state according to a specific period in order to recognize the presence or absence of a frame to be transmitted to the STA (or in order to receive a signal indicating the presence of the frame on the assumption that the presence of the frame to be transmitted to the STA is decided).

The AP may transmit a beacon frame to STAs in a BSS at predetermined intervals. The beacon frame may include a traffic indication map (TIM) information element. The TIM information element may include information indicating that the AP has buffered traffic for STAs associated therewith and will transmit frames. TIM elements include a TIM used to indicate a unicast frame and a delivery traffic indication map (DTIM) used to indicate a multicast or broadcast frame.

Figure 7:
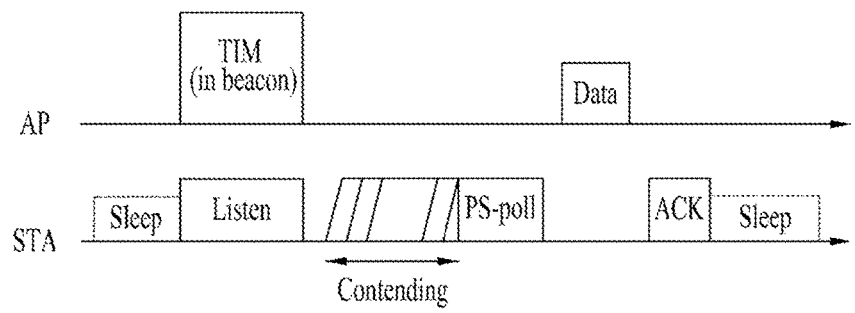
FIGS. 7 to 9 are explanatory diagrams of operation of an STA that has received TIM.
Figure 8:
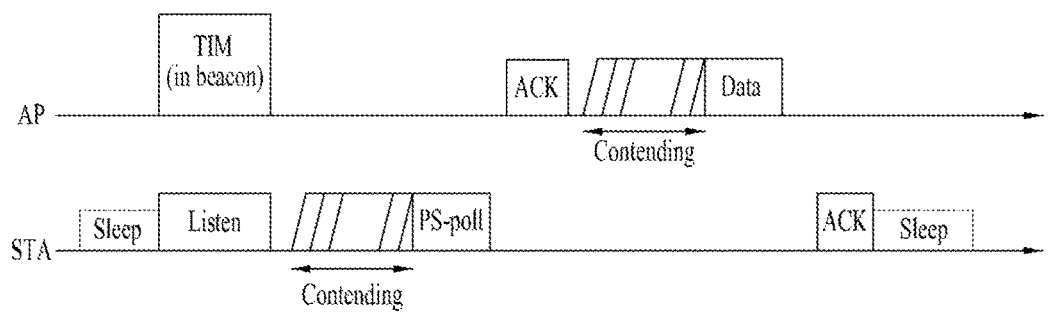
Figure 9:
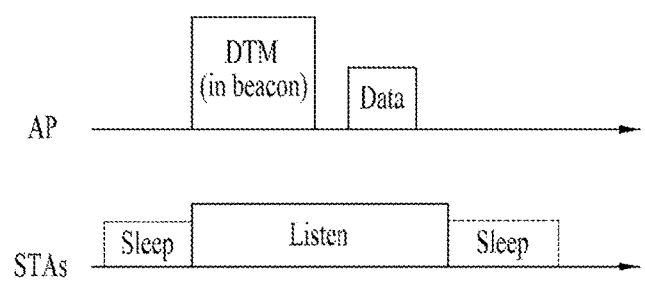

FIGS. 7 to 9 are conceptual diagrams illustrating detailed operations of the STA having received a Traffic Indication Map (TIM).

Referring to FIG. 7, STA is switched from the sleep state to the awake state so as to receive the beacon frame including a TIM from the AP. STA interprets the received TIM element such that it can recognize the presence or absence of buffered traffic to be transmitted to the STA. After STA contends with other STAs to access the medium for PS-Poll frame transmission, the STA may transmit the PS-Poll frame for requesting data frame transmission to the AP. The AP having received the PS-Poll frame transmitted by the STA may transmit the frame to the STA. STA may receive a data frame and then transmit an ACK frame to the AP in response to the received data frame. Thereafter, the STA may re-enter the sleep state.

As can be seen from FIG. 7, the AP may operate according to the immediate response scheme, such that the AP receives the PS-Poll frame from the STA and transmits the data frame after lapse of a predetermined time [for example, Short Inter-Frame Space (SIFS)]. In contrast, the AP having received the PS-Poll frame does not prepare a data frame to be transmitted to the STA during the SIFS time, such that the AP may operate according to the deferred response scheme, and as such a detailed description thereof will hereinafter be described with reference to FIG. 8.

The STA operations of FIG. 8 in which the STA is switched from the sleep state to the awake state, receives a TIM from the AP, and transmits the PS-Poll frame to the AP through contention are identical to those of FIG. 7. If the AP having received the PS-Poll frame does not prepare a data frame during the SIFS time, the AP may transmit the ACK frame to the STA instead of transmitting the data frame. If the data frame is prepared after transmission of the ACK frame, the AP may transmit the data frame to the STA after completion of such contending. STA may transmit the ACK frame indicating successful reception of a data frame to the AP, and may be shifted to the sleep state.

FIG. 9 shows the exemplary case in which AP transmits DTIM. STAs may be switched from the sleep state to the awake state so as to receive the beacon frame including a DTIM element from the AP. STAs may recognize that multicast/broadcast frame(s) will be transmitted through the received DTIM. After transmission of the beacon frame including the DTIM, AP may directly transmit data (i.e., multicast/broadcast frame) without transmitting/receiving the PS-Poll frame. While STAs continuously maintains the awake state after reception of the beacon frame including the DTIM, the STAs may receive data, and then switch to the sleep state after completion of data reception.

General Frame Structure

Figure 10:
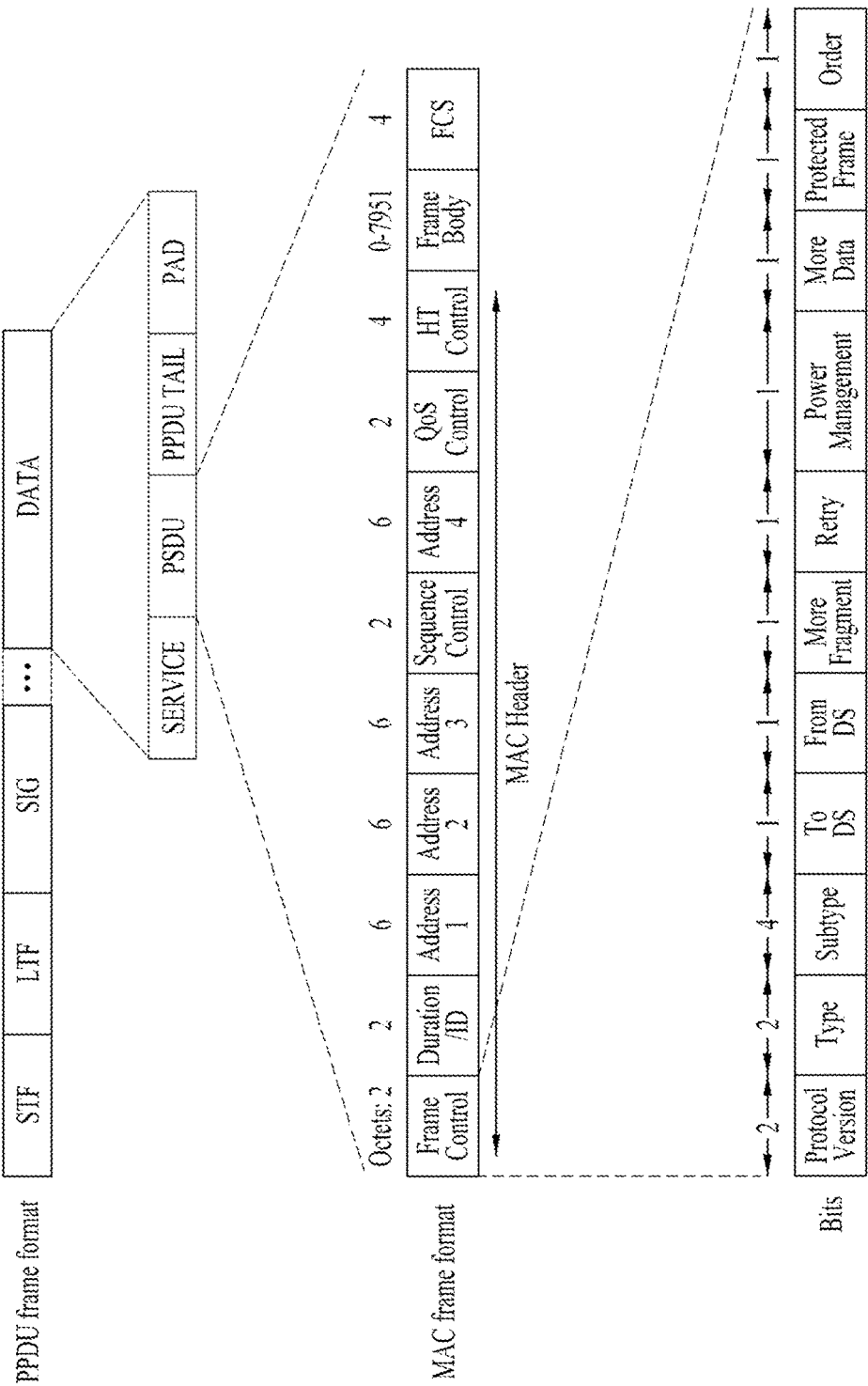
FIG. 10 is an explanatory diagram of an exemplary frame structure used in an IEEE 802.11 system.

FIG. 10 is an explanatory diagram of an exemplary frame structure used in an IEEE 802.11 system.

A PPDU (Physical Layer Protocol Data Unit) frame format may include an STF (Short Training Field), am LTF (Long Training Field), a SIG (SIGNAL) field and a data field. The most basic (e.g., non-HT (High Throughput)) PPDU frame format may include only an L-STF (Legacy-STF), an L-LTF (Legacy-LTF), a SIG field and a data field.

The STF is a signal for signal detection, AGC (Automatic Gain Control), diversity selection, accurate time synchronization, etc., and the LTF is a signal for channel estimation, frequency error estimation, etc. The STF and LTF may be collectively called a PLCP preamble. The PLCP preamble may be regarded as a signal for OFDM physical layer synchronization and channel estimation.

The SIG field may include a RATE field and a LENGTH field. The RATE field may include information about modulation and coding rates of data. The LENGTH field may include information about the length of data. In addition, the SIG field may include a parity bit, a SIG TAIL bit, etc.

The data field may include a SERVICE field, a PSDU (Physical layer Service Data Unit) and a PPDU TAIL bit. The data field may also include padding bits as necessary. Some bits of the SERVICE field may be used for synchronization of a descrambler at a receiving end. The PSDU corresponds to an MPDU (MAC Protocol Data Unit) defined in the MAC layer and may include data generated/used in a higher layer. The PPDU TAIL bit may be used to return an encoder to state 0. The padding bits may be used to adjust the length of the data field to a predetermined unit.

The MPDU is defined depending on various MAC frame formats, and a basic MAC frame includes a MAC header, a frame body and an FCS (Frame Check Sequence). The MAC frame may be composed of the MPDU and transmitted/received through PSDU of a data part of the PPDU frame format.

The MAC header includes a frame control field, a duration/ID field, an address field, etc. The frame control field may include control information necessary for frame transmission/reception. The duration/ID field may be set to a time to transmit a relevant a relevant frame.

The duration/ID field included in the MAC header may be set to a 16-bit length (e.g., B0 to B15). Content included in the duration/ID field may depend on frame type and sub-type, whether transmission is performed for a CFP (contention free period), QoS capability of a transmission STA and the like. (i) In a control frame corresponding to a sub-type of PS-Poll, the duration/ID field may include the AID of the transmission STA (e.g., through 14 LSBs) and 2 MSBs may be set to 1. (ii) In frames transmitted by a PC (point coordinator) or a non-QoS STA for a CFP, the duration/ID field may be set to a fixed value (e.g., 32768). (iii) In other frames transmitted by a non-QoS STA or control frames transmitted by a QoS STA, the duration/ID field may include a duration value defined per frame type. In a data frame or a management frame transmitted by a QoS STA, the duration/ID field may include a duration value defined per frame type. For example, B15=0 of the duration/ID field indicates that the duration/ID field is used to indicate a TXOP duration, and B0 to B14 may be used to indicate an actual TXOP duration. The actual TXOP duration indicated by B0 to B14 may be one of 0 to 32767 and the unit thereof may be microseconds (μs). However, when the duration/ID field indicates a fixed TXOP duration value (e.g., 32768), B15 can be set to 1 and B0 to B14 can be set to 0. When B14=1 and B15=1, the duration/ID field is used to indicate an AID, and B0 to B13 indicate one AID of 1 to 2007. Refer to the IEEE 802.11 standard document for details of Sequence Control, QoS Control, and HT Control subfields of the MAC header.

The frame control field of the MAC header may include Protocol Version, Type, Subtype, To DS, From DS, More Fragment, Retry, Power Management, More Data, Protected Frame and Order subfields. Refer to the IEEE 802.11 standard document for contents of the subfields of the frame control field.

Figure 11:
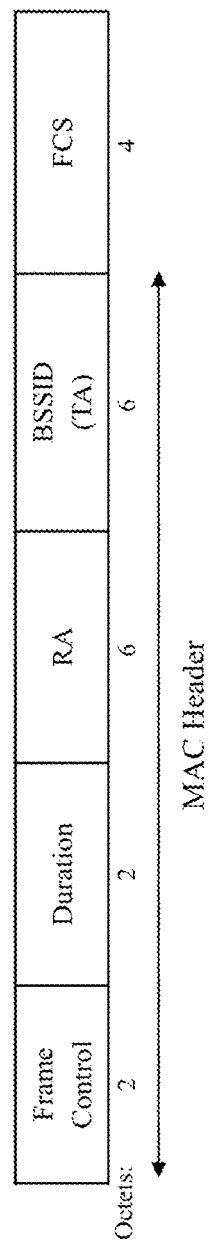
FIG. 11 illustrates a contention free (CF)-END frame.
Figure 13:
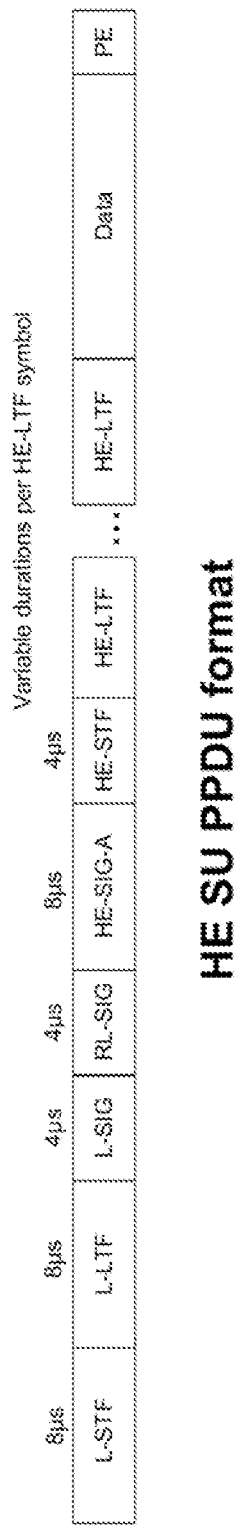
FIG. 13 illustrates an example of the HE PPDU.
Figure 14:
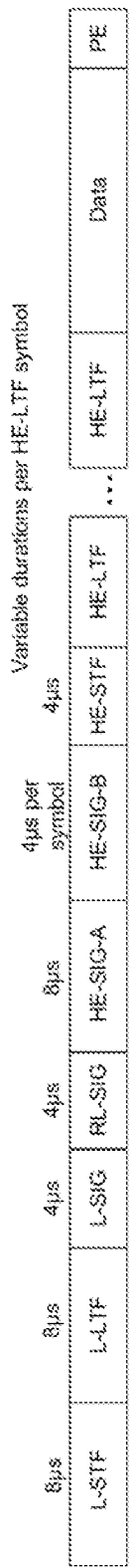
FIG. 14 illustrates another example of the HE PPDU.
Figure 15:
FIG. 15 illustrates another example of the HE PPDU.
Figure 16:
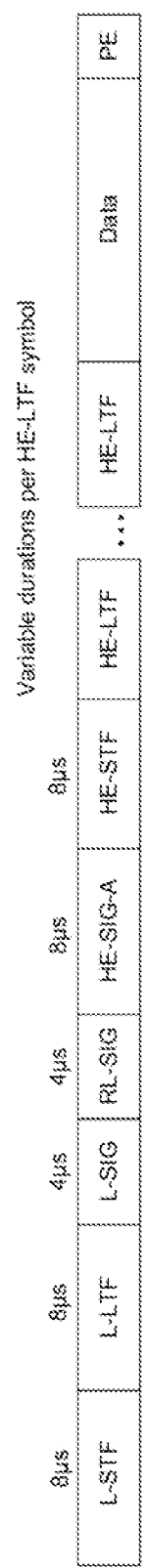
FIG. 16 illustrates another example of the HE PPDU.

FIG. 11 illustrates a CF (contention free)-END frame.

It is assumed that the CF-END frame is transmitted by a non-DMG (directional multi-gigabit, 11ad) STA for convenience of description. The CF-END frame may be transmitted to truncate a TXOP duration. Accordingly, a duration field is set to 0 in the CF-END frame. An RA (Receiver Address) field may be set to a broadcast group address. A BSSID field may be set to an STA address included in a relevant AP. However, in the case of a CF-END frame in a non-HT or non-HT duplicate format, which is transmitted from a VHT STA to a VHT AP, an Individual/Group bit of the BSSID field may be set to 1.

Example of VHT PPDU

FIG. 12 illustrates an example of VHT (Very High Throughput) PPDU format.

The VHT PPDU format may include at least one of a VHT-SIG-A field, a VHT-STF field, a VHT-LTF field, and a VHT-SIG-B field between the L-SIG field and the data field.

The VHT-SIG A may be consisting of VHT SIG-A1 and VHT SIG-A2. In this case, each of the VHT SIG-A1 and the VHT SIG-A2 can be configured by 24 data bits and the VHT SIG-A1 can be transmitted prior to the VHT SIG-A2. In this case, the VHT SIG-A1 can include a BW field, an STBC field, a group ID field, an NSTS/partial AID field, a TXOP_PS_NOT_ALLOWED field, and a reserved field. And, the VHT SIG-A2 can include a short GI field, a short GI NSYM disambiguation field, an SU/MU[0] coding field, an LDPC extra OFDM symbol field, an SU VHT-MCS/MU [1-3] coding field, a beamformed field, a CRC field, a tail field, and a reserved field. Through the aforementioned fields, it may be able to check information on the VHT PPDU. The PAID in VHT SIG-A1 is a non-unique STA identifier and the PAID is transmitted via TXVECTOR parameter PARTIAL_AID of VHT SU PPDU. The length of PAID is limited to 9 bits.

Example of HE PPDU

A description will be given of examples of an HE PPDU (High Efficiency Physical layer Protocol Data Unit) format in a wireless LAN system supporting 11ax.

FIGS. 13 to 16 illustrate examples of the HE PPDU.

An HE-SIG A field follows an L-Part (e.g., L-STF, L-LTF, L-SIG) and is duplicated every 20 MHz like the L-Part. For the HE-SIG A field, a DFT period of 3.2 μs and a subcarrier spacing of 312.5 KHz may be used. If MCS 0 is used, for example, the HE-SIG A field can be composed of 2 symbols.

HE-SIG A can be included in all HE PPDUs, whereas HE-SIG B can be omitted in an SU PPDU and a UL trigger based PPDU (e.g., a UL PPDU transmitted on the basis of a trigger frame).

The HE-SIG A field includes common control information (e.g., BW, GI length, BSS index, CRC, Tail, etc.) for STAs. The HE-SIG A field includes information for decoding the HE PPDU and thus information included in the HE-SIG A field may depend on the format of the HE PPDU (e.g., SU PPDU, MU PPDU, trigger-based PPDU or the like). For example, in the HE SU PPDU format, the HE-SIG A field may include at least one of a DL/UL indicator, HE PPDU format indicator, BSS color, TXOP duration, BW (bandwidth), MCS, CP+LTF length, coding information, the number of streams, STBC (e.g., whether STBC is used), transmission beamforming (TxBF) information, CRC and Tail. In the case of the HE SU PPDU format, the HE-SIG B field may be omitted. In the HE MU PPDU format, the HE-SIG A field may include at least one of a DL/UL indicator, BSS color, TXOP duration, BW, MCS information of a SIG B field, the number of symbols of the SIG B field, the number of HE LTF symbols, indicator indicating whether full band MU-MIMO is used, CP+LTF length, transmission beamforming (TxBF) information, CRC and Tail. In the HE trigger-based PPDU format, an HE-SIG A field may include at least one of a format indicator (e.g., indicating the SU PPDU or trigger-based PPDU), BSS color, TXOP duration, BW, CRC and Tail.

The HE-SIG A may include user allocation information, for example, at least one of an STA ID such as a PAID or a GID, allocated resource information and the number of streams (Nsts), in addition to the common control information.

BSS color information included in the HE-SIG A field is information for identifying a BSS and has a length shorter than a BSSID. For example, the BSSID can have a length of 48 bits whereas the BSS color information can have a length of 6 bits. An STA can determine whether a frame is an intra-BSS frame using the BSS color information. That is, the STA can discriminate an intra-BSS PPDU from an inter-BSS PPDU by decoding only the HE-SIG A field without the need to decode the entire HE PPDU.

The HE-SIG B may include independent information per 20 MHz channel. The HE-SIG B may be transmitted in a 1× symbol structure like the Legacy part (e.g., L-STF, L-LTF, L-SIG) and HE-SIG A. Meanwhile, a length of "L-STF+L-LTF+L-SIG+HE-SIGA+HE-SIGB" needs to be identical in all channels in a wide bandwidth. The HE-SIG B transmitted per 20 MHz channel may include allocation information about the corresponding band, for example, allocation information per user using the corresponding band, user ID, etc. However, the information of the HE-SIG B may vary between bands because the respective bands support different numbers of users and use different resource block configurations. Accordingly, the length of the HE-SIG B may be different for respective channels.

According to an example, one HE-SIG B field can be transmitted when the bandwidth does not exceed 20 MHz. When the bandwidth exceeds 20 MHz, 20 MHz channels may respectively transmit one of a first type HE-SIG B (referred to hereinafter as HE-SIG B [1]) and a second type HE-SIG B (referred to hereinafter as HE-SIG B [2]). For example, HE-SIG B [1] and HE-SIG B [2] may be alternately transmitted. An odd-numbered 20 MHz channel may deliver HE-SIG B [1] and an even-numbered 20 MHz channel may deliver HE-SIG B [2]. More specifically, in the case of a 40 MHz bandwidth, HE-SIG B [1] is transmitted over the first 20 MHz channel and HE-SIG B [2] is transmitted over the second 20 MHz channel. In the case of an 80 MHz bandwidth, HE-SIG B [1] is transmitted over the first 20 MHz channel, HE-SIG B [2] is transmitted over the second 20 MHz channel, the same HE-SIG B [1] is duplicated and transmitted over the third 20 MHz channel and the same HE-SIG B [2] is duplicated and transmitted over the fourth 20 MHz channel. The HE-SIG B is transmitted in a similar manner in the case of a 160 MHz bandwidth.

HE-SIG B [1] and HE-SIG B [2] may have different content. However, HE-SIG-Bs [1] have the same content. Similarly, HE-SIG Bs [2] have the same content.

The HE-SIG B may include a common field and a user-specific field. The common field may precede the user-specific field. The common field and the user-specific field may be distinguished in a unit of bit(s) instead of a unit of OFDM symbol(s).

The common field of the HE-SIG B includes information about all STAs designated to receive PPDUs in a corresponding bandwidth. The common field may include resource unit (RU) allocation information. All the HE-SIG Bs [1] may have the same content and all the HE-SIG Bs [2] may have the same content. For example, when four 20 MHz channels constituting 80 MHz are classified as [LL, LR, RL, RR], the common field of HE-SIG B [1] may include a common block for LL and RL and the common field of HE-SIG B [2] may include a common block for LR and RR.

The user-specific field of the HE-SIG B may include a plurality of user fields. Each user field may include information specific to an individual STA designated to receive PPDUs. For example, the user field may include at least one of an STA ID, MCS per STA, the number of streams (Nsts), coding (e.g., indication of use of LDPC), DCM indicator and transmission beamforming information. However, the information of the user field is not limited thereto.

HE Operation Element

Figure 17:
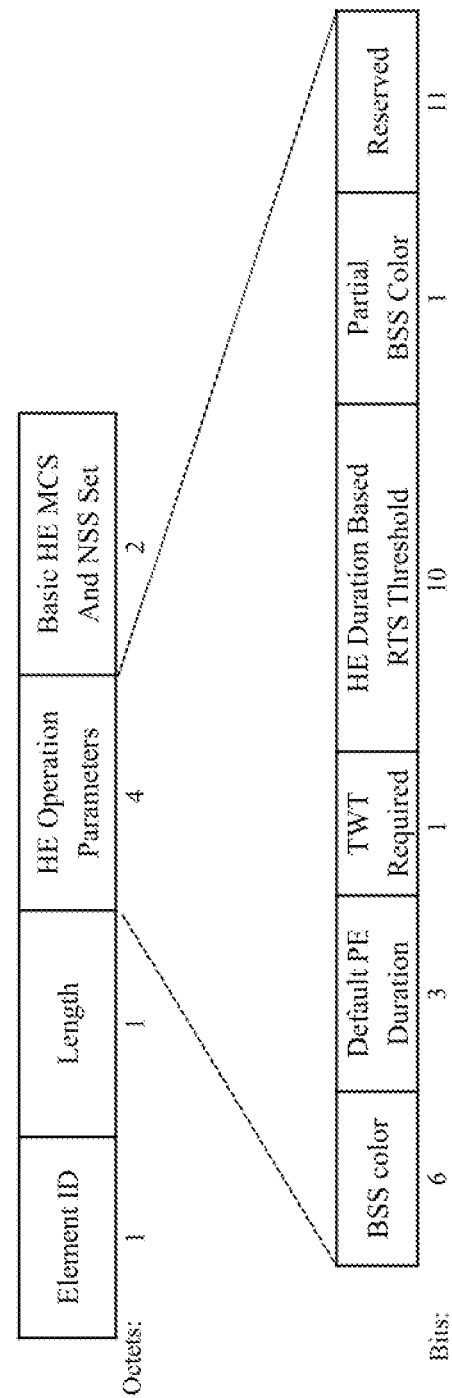
FIG. 17 illustrates an example of the HE operation element.

FIG. 17 illustrates an example of HE operation element.

The operation of HE STAs in an HE BSS may be controlled by the HT Operation element, the VHT Operation element and the HE Operation element.

The BSS Color field is an unsigned integer whose value is the BSS color of the BSS corresponding to the AP which transmitted this element, except that a value of 0 in this field indicates that there is no BSS color for this BSS. The BSS Color field is an unsigned integer whose value is the BSS Color of the BSS corresponding to the AP, IBSS STA, mesh STA or TDLS STA that transmitted this element, except that a value of 0 in this field is used if one or more intended recipient STAs of an HE PPDU is not a member of a transmitting STA's BSS The Default PE Duration subfield indicates the PE duration in units of 4 µs, for an HE trigger-based PPDU that is solicited with UL MU Response Scheduling in the A-Control subfield. Values 5-7 of the Default PE Duration subfield are reserved.

The TWT Required subfield is set to 1 to indicate that the AP requires the non-AP HE STAs to operate in the role of either TWT requesting STA, or TWT scheduled STA, and set to 0 otherwise.

The HE Duration Based RTS Threshold field allows an HE AP to manage RTS/CTS usage by the associated HE STAs. The value is specified as an unsigned integer, in units of 32 us. The value 0 indicates that RTS/CTS must be used for all the data transmit sequences. The value 1023 indicates that this feature is disabled.

The Partial BSS Color field indicates whether or not the BSS applies an AID assignment rule using the partial BSS color bits. If the Partial BSS Color field is set to 1, then the 4 least significant bits of BSS color are used in AID assignment. If the Partial BSS Color field is set to 0, no partial BSS color bits are used in the AID assignment.

The Basic HE MCS And NSS Set field indicates the HE-MCSs for each number of spatial streams in HE PPDUs that are supported by all HE STAs in the BSS (including IBSS and MBSS). The Basic HE MCS And NSS Set field is a bitmap of size 16 bits. Each 2 bit pair in the bitmap indicates the supported HE-MCS set for NSS from 1 to 8.

TX Power Based RTS/CTS Control Mechanism

RTS/CTS mechanism has been proposed so as to reduce packet collision due to a hidden node. Generally the STA initiates an RTS/CTS mechanism based on RTS Threshold (e.g., MAC PDU length or PPDU length) which is included in beacon/probe response frame, before transmitting a frame. That is, the conventional RTS threshold refers to a length of frame (e.g., MAC PDU length or PPDU length). For example, if a predetermined frame a STA trying to transmit is longer than the RTS threshold, then the STA needs to initiate RTS/CTS mechanism before transmission of the predetermined frame. Otherwise, the RTS/CTS mechanism may not be initiated. Once RTS/CTS mechanism has been initiated, the STA has to receive the CTS frame from the receiver in response to the RTS frame, before transmitting the predetermined frame.

Meanwhile, in a dense environment considered in the IEEE 802.11 ax based WLAN system, hidden node problem can be more frequently occur. Thus, AP can control the RTS/CTS mechanism of STAs to solve the hidden node problem. For example, the AP may instruct the STA to transmit RTS frame, if necessary.

In the following description, a novel RTS/CTS control/initiation mechanism is suggested according to an embodiment of this invention.

AP may transmit information for controlling an RTS/CTS procedure of the STA. Information for controlling the RTS/CTS procedure may be used to control initiation of the RTS/CTS procedure. For example, RTS transmission may be triggered on the basis of information for controlling the RTS/CTS procedure.

Information for controlling the RTS/CTS procedure will hereinafter be referred to as "RTS transmission request information before frame transmission", "RTS transmission request information, or "RTS transmission control information", without being limited thereto.

For example, the AP may include "RTS transmission request information before frame transmission" in an HE Operation element (or HE Capability element) during a beacon/probe response or association response frame, and may transmit the resultant HE operation element. STAs may determine whether to transmit the RTS frame before frame transmission on the basis of "RTS transmission request information before frame transmission" contained in the HE Operation element (or HE Capability element).

FIG. 18 is a conceptual diagram illustrating "RTS transmission request information before frame transmission" according to the embodiment of the present disclosure. Referring to FIG. 18, "RTS transmission request information before frame transmission" may include at least one of an Element ID field, a Length field, an RTS required field, and a TW_PW threshold field, without being limited thereto.

If the RTS Required field is enabled (e.g., RTS Required=1), STA may determine whether to perform RTS transmission on the basis of the TX_PW_Threshold value during frame transmission. For example, assuming that the STA performs Transmit Power Control, if the controlled (or adjusted) transmit (Tx) power is lower than TX_PW_Threshold, the STA may perform RTS/CTS transmission and reception before frame transmission and may then transmit the frame. If Tx power of the frame to be transmitted by the STA is equal to or less than a predetermined level, the influence of interference/collision of the hidden node may be relatively increased. In other words, as the Tx power is gradually reduced, there is a high possibility of causing frame transmission failure due to the problem of the hidden node. Therefore, If Tx power of the frame to be transmitted by the STA is equal to or less than a threshold value (e.g., TX_PW_Threshold received from the AP), the RTS/CTS procedure may be initiated. As described above, if the STA acquires the transmission opportunity (TXOP) through the RTS/CTS frame, hidden nodes corresponding to the third parties do not perform channel access during TXOP. Therefore, STA can correctly transmit and receive the frame having low Tx power.

In another example, if Tx power is higher than TX_PW_Threshold, the STA may exchange the RTS/CTS with the AP before frame transmission.

In the meantime, if "RTS transmission request information before frame transmission" is transmitted through the HE Operation element (or HE Capability element), "RTS transmission request information before frame transmission" may be equally applied to all STAs associated with the AP within the BSS.

Beside the method for applying the same RTS transmission request information to all the STAs located in the BSS, independent RTS transmission request information may also be applied to each STA. For example, as a method for performing RTS/CTS control in different ways according to the respective STAs, the AP may include "RTS transmission request information" in the MAC header of the DL frame transmitted to the STA, and may transmit the resultant DL frame to the STA. Therefore, upon receiving the DL frame including "RTS transmission request information" from the AP, the STA may determine whether to transmit the RTS frame before transmitting its own frame on the basis of the received RTS transmission request information.

"RTS transmission request information" contained in the MAC header may be established in a similar way to "RTS transmission request information" contained in the above HE operation element. For example, the RTS Required field and TX_PW_Threshold information may be contained in the MAC header. RTS transmission request information may be contained in the MAC header through the HE (A)-Control field. In other words, at least one of the RTS Required field and the TX_PW_Threshold may be contained as one type in the HE A-Control field, and then transmitted.

In accordance with one embodiment, only the RTS Required field may be contained in the RTS transmission request information. For example, it is assumed that the received RTS Required field is enabled (e.g., is set to 1) and the STA transmits the frame (e.g., UL frame). The STA may transmit the RTS to the AP before UL frame transmission. If the STA receives the CTS from the AP, the STA transmits the UL frame to the AP. If the RTS Required field is enabled, it can be appreciated that the STA may always initiate the RTS/CTS procedure before frame transmission.

In the meantime, if the received RTS Required field is disabled (e.g., is set to 0), the STA does not always transmit the RTS before frame transmission, and may initiate the RTS/CTS procedure on the basis of a conventional RTSThreshold value. Here, the conventional RTSThreshold may denote the length of a frame. For example, this means that the received RTS Required field is disabled. If the frame length exceeds a predetermined length defined by RTSThreshold, the STA may transmit the RTS frame. However, if the frame length is equal to or less than RTSThreshold, the STA may immediately transmit the corresponding frame without execution of the RTS/CTS procedure.

In accordance with another embodiment, the RTS Required field and TX_PW_Threshold may be contained in "RTS transmission request information". For example, it is assumed that both RTS Required and TX_PW Threshold are contained in the MAC header (e.g., HE A-Control field). If RTS Required field=1 is established and the frame Tx power is equal to or less than TX_PW_Threshold, the STA may transmit the frame after exchanging RTS/CTS with the AP. In contrast, although RTS Required field=1 is established, if the frame Tx power exceeds TX_PW_Threshold, the STA may also transmit the frame without exchange of the RTS/CTS.

Meanwhile, if the STA receives information (e.g., RTS required field) regarding RTS use setting from the AP when using RTSThreshold, the STA may determine whether to perform RTS transmission on the basis of information received from the AP. For example, if the STA receives "RTS required field=1" from the AP, the STA may also transmit the RTS frame prior to transmission of the corresponding frame, without exceeding the RTSThreshold currently used by the frame to be transmitted by the STA.

In addition, the AP may transmit the RTSThreshold value to the STA. If the STA receives RTSThreshold from the AP, the STA may determine whether to perform RTS transmission using the RTSThreshold received from the AP. The STA may determine whether to perform RTS transmission using a new RTSThreshold newly received from the AP, instead of the old RTSThreshold.

As described above, the AP may transmit at least one of RTS Required field, RTSThreshold, and RTS_TX_PW_Threshold to the STA. "RTS transmission request information" may be transmitted to STAs through at least one of HE Operation element, HE Capability element, and HE A-Control field/frame. Upon receiving "RTS transmission request information" for controlling RTS transmission from the AP, STA may determine whether to perform RTS transmission using "RTS transmission request information". As described above, if "RTS transmission request information" includes only the RTS Required field, when the RTS Required field is enabled (e.g., is set to 1), the STA may perform RTS/CTS transmission and reception before transmitting the frame to the AP.

As described above, assuming that the same RTS transmission request information includes "TX_PW_Threshold", the STA may determine whether to perform RTS transmission on the basis of the TX_PW_Threshold value. For example, assuming that Tx power of the frame to be transmitted is less than RTS_TX_PW_Threshold, the STA may transmit the RTS.

In another embodiment, the STA may also determine whether to transmit the RTS through both "TX_PW_Threshold" received from the AP and its own dot11RTSThreshold value. The dot11RTSThreshold value may be a conventional RTSThreshold for initiating the RTS/CTS procedure on the basis of the frame length. For example, if Tx power is less than TX_PW_Threshold and the Tx packet (e.g., one of frame/MPDU/PPDU/A-MPDU/PSDU) is larger in size than the dot11RTSThreshold value, the STA may transmit the RTS before frame transmission.

As described above, the AP may transmit RTSThreshold to the STA. In this case, RTSThreshold transmitted by the AP may be a threshold value regarding a packet length. If the STA receives the RTSThreshold from the AP, the STA may determine whether to perform RTS transmission on the basis of the received RTSThreshold. For example, when the packet to be transmitted is larger in size than RTSThreshold, STA may transmit the RTS. It can be appreciated that RTSThreshold transmitted by the AP overrides a legacy RTSThreshold (e.g., conventional dot11RTSThreshold) owned by the STA.

In addition, some or all of RTS Required field, RTS_TX PW_Threshold, and RTSThreshold may be combined as necessary.

As described above, when the RTS Required field is disabled (e.g., is set to 0), the STA may determine whether to use the RTS on the basis of the dot11RTSThreshold value thereof. For example, the STA may perform the legacy RTS transmission on the basis of the conventional dot11RTSThreshold.

Figure 19:
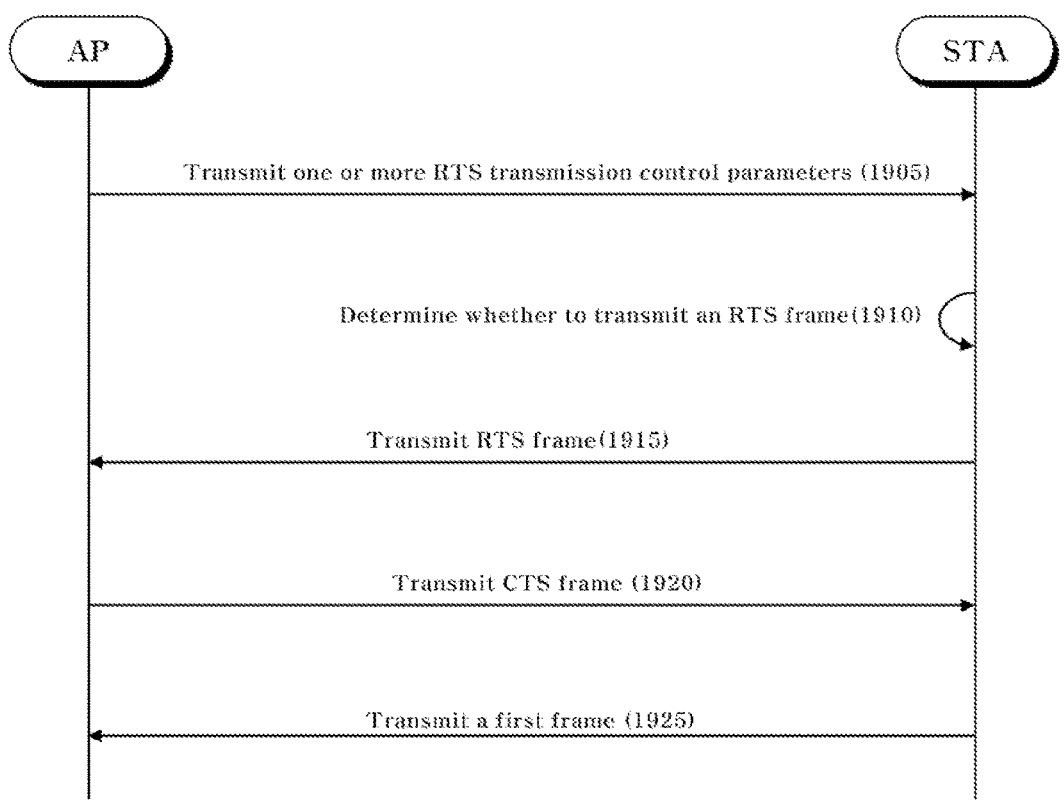
FIG. 19 illustrates an example of the RTS/CTS procedure according to an embodiment of this invention.

FIG. 19 illustrates an example of the RTS/CTS procedure according to an embodiment of this invention. Description of the elements already described above will be omitted.

Referring to FIG. 19, the STA receives, from an access point (AP), one or more RTS transmission control parameters (1905). The one or more RTS transmission control parameters may include at least one of a transmission power threshold for controlling the RTS frame transmission, a RTS threshold indicating a predetermined packet length and a RTS transmission required field.

For example, the one or more RTS transmission control parameters may be received through at least one of a beacon frame, a probe response frame and an association response frame from the AP, and the received one or more RTS transmission control parameters may be commonly applied to STAs associated with the AP.

Or, the one or more RTS transmission control parameters may be received through a MAC header of a downlink frame from the AP, and the one or more RTS transmission control parameters may be specific to the STA.

The STA determines whether to transmit an RTS frame prior to transmitting a first frame, based on the one or more RTS transmission control parameters (1910). For example, when the STA has a first frame to transmit, the STA determines whether to initiate the RTS/CTS procedure before transmitting the first frame.

The STA may estimate the transmission power to be used for transmitting the first frame. And, the STA may compare the transmission power of the first frame with the TX power threshold received from the AP. When the transmission power of the first frame is less than or equals to the transmission power threshold received from the AP, the STA may determine to transmit the RTS frame (i.e., RTS/CTS procedure initiation) prior to transmitting the first frame.

For simplicity, a case where the UE determined to transmit the RTS frame will be described, but embodiments of the present invention are not limited thereto. For example, the STA may transmit the first frame without transmitting the RTS frame when the transmission power of the first frame is greater than the transmission power threshold received from the AP.

The STA transmits RTS frame (1915). The STA receives CTS frame in response to the RTS frame (1920). After receiving the CTS frame, the STA transmits the first frame (1925).

The STA may transmit the RTS frame prior to transmitting the first frame when a packet length of the first frame is longer than the RTS threshold received from the AP and the transmission power of the first frame is less than or equals to the transmission power threshold received from the AP.

The STA may transmit the RTS frame prior to transmitting the first frame when the RTS transmission required field received from the AP has been enabled and the transmission power of the first frame is less than or equals to the transmission power threshold received from the AP.

When the RTS transmission required field received from the AP has been disabled, the STA may determine whether to transmit an RTS frame by using only a dot11RTSThreshold parameter that is locally stored in the STA.

When the RTS transmission required field received from the AP has been enabled, the RTS threshold received from the AP may override the dot11RTSThreshold parameter locally stored in the STA.

Figure 20:
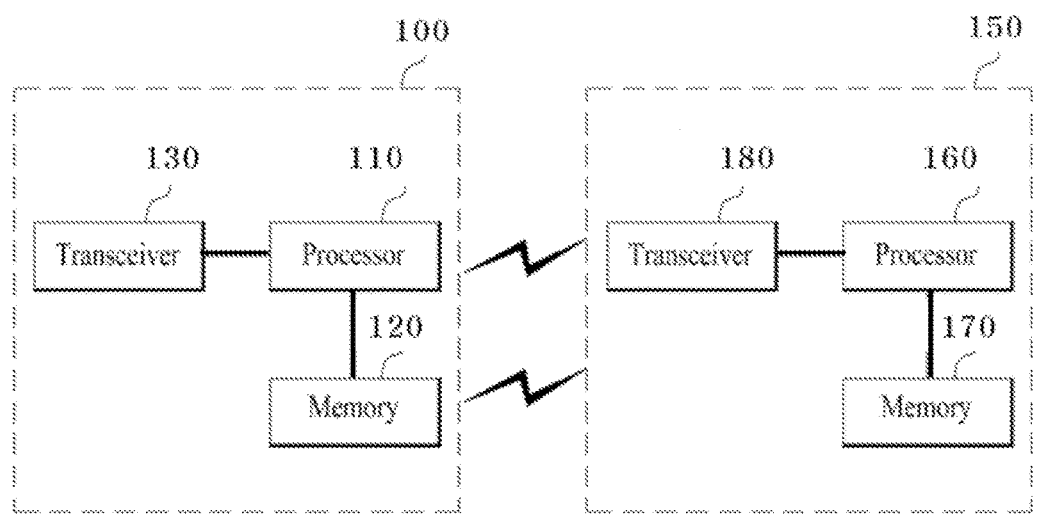
FIG. 20 illustrates an apparatus according to an embodiment of the present invention.

FIG. 20 illustrates devices for implementing the aforementioned methods.

A wireless device 100 and a wireless device 150 in FIG. 20 may correspond to the aforementioned specific STA and AP, respectively.

The STA 100 may include a processor 110, a memory 120, and a transceiver 130 and the AP 150 may include a processor 160, a memory 170, and a transceiver 160. The transceivers 130 and 180 may transmit/receive a wireless signal and may be implemented in a physical layer of IEEE 802.11/3GPP. The processors 110 and 160 are implemented in a physical layer and/or a MAC layer and are connected to the transceivers 130 and 180. The processors 110 and 160 may perform the above-described UL MU scheduling procedure.

The processors 110 and 160 and/or the transceivers 130 and 180 may include an Application-Specific Integrated Circuit (ASIC), a chipset, a logical circuit, and/or a data processor. The memories 120 and 170 may include a Read-Only Memory (ROM), a Random Access Memory (RAM), a flash memory, a memory card, a storage medium, and/or a storage unit. If an example is performed by software, the above-described method may be executed in the form of a module (e.g., a process or a function) performing the above-described function. The module may be stored in the memories 120 and 170 and executed by the processors 110 and 160. The memories 120 and 170 may be located at the interior or exterior of the processors 110 and 160 and may be connected to the processors 110 and 160 via known means.

The detailed description of the preferred examples of the present invention has been given to enable those skilled in the art to implement and practice the invention. Although the invention has been described with reference to the preferred examples, those skilled in the art will appreciate that various modifications and variations can be made in the present invention without departing from the spirit or scope of the invention described in the appended claims. Accordingly, the invention should not be limited to the specific examples described herein, but should be accorded the broadest scope consistent with the principles and novel features disclosed herein.

What is claimed is:

1. A method of initiating a request-to-send (RTS)/clear-to-send (CTS) procedure at a station (STA) in a wireless LAN system, the method comprising:
   receiving, from an access point (AP), one or more RTS transmission control parameters;
   determining whether to transmit an RTS frame prior to transmitting a first frame, based on the one or more RTS transmission control parameters; and
   transmitting at least one of the RTS frame or the first frame, wherein the one or more RTS transmission control parameters includes an RTS transmission required field and a transmission power threshold for controlling the RTS frame transmission, wherein the RTS transmission required field includes a 1-bit indicator indicating whether the STA should consider transmission power of the first frame or a packet length of the first frame for determining whether to transmit the RTS frame, wherein the STA transmits the RTS frame prior to transmitting the first frame when the transmission power of the first frame is less than or equal to the transmission power threshold received from the AP and the 1-bit indicator indicates the STA should consider the transmission power of the first frame, and wherein the STA transmits the RTS frame without transmitting the first frame when the transmission power of the first frame exceeds the transmission power threshold received from the AP and the 1-bit indicator indicates the STA should consider the transmission power of the first frame.

2. The method of claim 1,
wherein the one or more RTS transmission control parameters are received through at least one of a beacon frame, a probe response frame or an association response frame from the AP, and
wherein the received one or more RTS transmission control parameters are commonly applied to STAs associated with the AP.

3. The method of claim 1,
wherein the one or more RTS transmission control parameters are received through a Media Access Control (MAC) header of a downlink frame from the AP, and
wherein the one or more RTS transmission control parameters are specific to the STA.

4. The method of claim 1, wherein the one or more RTS transmission control parameters further includes an RTS threshold indicating a predetermined packet length.

5. The method of claim 4, wherein the STA transmits the RTS frame prior to transmitting the first frame when the packet length of the first frame is longer than the RTS threshold received from the AP and the 1-bit indicator indicates that the STA should consider the packet length of the first frame.

6. The method of claim 1, wherein the STA transmits the first frame without transmitting the RTS frame when the packet length of the first frame does not exceed the RTS threshold received from the AP and the 1-bit indicator indicates that the STA should consider the packet length of the first frame.

7. A station (STA) initiating a request-to-send (RTS)/clear-to-send (CTS) procedure, the STA comprising:
a receiver to receive, from an access point (AP), one or more RTS transmission control parameters;
a processor to determine whether to transmit an RTS frame prior to transmitting a first frame, based on the one or more RTS transmission control parameters; and
a transmitter to transmit at least one of the RTS frame or the first frame, wherein the one or more RTS transmission control parameters includes an RTS transmission required field and a transmission power threshold for controlling the RTS frame transmission, wherein the RTS transmission required field includes a 1-bit indicator indicating whether the STA should consider transmission power of the first frame or a packet length of the first frame for determining whether to transmit the RTS frame, wherein the processor controls the transmitter to transmit the RTS frame prior to transmitting the first frame when the transmission power of the first frame is less than or equal to the transmission power threshold received from the AP and the 1-bit indicator indicates the STA should consider the transmission power of the first frame, and wherein the processor controls the transmitter to transmit the first frame without transmitting the RTS frame when the transmission power of the first frame exceeds the transmission power threshold received from the AP and the 1-bit indicator indicates the STA should consider the transmission power of the first frame.

8. The STA of claim 7,
wherein the one or more RTS transmission control parameters are received through at least one of a beacon frame, a probe response frame or an association response frame from the AP, and
wherein the received one or more RTS transmission control parameters are commonly applied to STAs associated with the AP.

9. The STA of claim 7,
wherein the one or more RTS transmission control parameters are received through a Media Access Control (MAC) header of a downlink frame from the AP, and
wherein the one or more RTS transmission control parameters are specific to the STA.

10. The STA of claim 7, wherein the one or more RTS transmission control parameters further includes an RTS threshold indicating a predetermined packet length.

11. The STA of claim 10, wherein the processor controls the transmitter to transmit the RTS frame prior to transmitting the first frame when the packet length of the first frame is longer than the RTS threshold received from the AP and the 1-bit indicator indicates that the STA should consider the packet length of the first frame.

12. The STA of claim 7, wherein the processor controls the transmitter to transmit the first frame without transmitting the RTS frame when the packet length of the first frame does not exceed the RTS threshold received from the AP and the 1-bit indicator indicates that the STA should consider the packet length of the first frame.

* * * * *